United States Patent [19]

Lindy

[11] Patent Number: 5,091,424

[45] Date of Patent: Feb. 25, 1992

[54] REDUCTION OF LEACHABLES FROM TYPE II ANION EXCHANGE RESINS

[75] Inventor: Lowell B. Lindy, Midland, Mich.

[73] Assignee: The Dow Chemical Company, Midland, Mich.

[21] Appl. No.: 549,678

[22] Filed: Jul. 5, 1990

Related U.S. Application Data

[63] Continuation of Ser. No. 299,198, Jan. 23, 1989, abandoned.

[51] Int. Cl.$^5$ .............................................. C08F 5/20
[52] U.S. Cl. ......................................... 521/33; 521/26
[58] Field of Search .................................... 526/26, 33

[56] References Cited

U.S. PATENT DOCUMENTS

| | | | |
|---|---|---|---|
| 3,168,571 | 2/1965 | Hare | 260/593 |
| 3,417,016 | 12/1968 | Yagishita | 210/34 |
| 3,458,439 | 7/1969 | Schmidt | 210/32 |

FOREIGN PATENT DOCUMENTS

| | | | |
|---|---|---|---|
| 2426274 | 1/1973 | Fed. Rep. of Germany . | |
| 1577197 | 4/1967 | France . | |
| 2314213 | 11/1977 | France . | |
| 2457712 | 10/1979 | France . | |
| 771719 | 4/1957 | United Kingdom | 521/26 |

OTHER PUBLICATIONS

Chemical Abstracts 84(7):41,942m, Author: Uher et al., "Application of Anion Exchangers in the Treatment of Synthetic Ethanol for Fermentation Purposes", 1975, J. Vys. Sk. Chem.-Technol., Praze, Potraviny, E43, 113–126.

The Water Quality Association's Draft Response to the Environmental Protection Agency, Aug. 28, 1987.

Chem. Abstracts, p. 257, vol. 83, 1975, item 168216n, Regeneration of Ion Exchanges for Chromium-Containing Waste-Water Treatment, Japan, 22, Apr. 1975 (Kokai 75 44,984).

Chem. Abstracts, p. 58, vol. 106, 1987, item 197601h, Czech CS 235,485, 15, Nov. 1986, Method of Preparation of Heterogeneous Ion Exchanger Membranes.

Chem. Abstracts, p. 608, vol. 89, 1978, item 23793n, Purification of E-caprolactone, Japan, Kokai 78, 37,679, 6, Apr. 1978.

Chem. Abstracts, p. 317, vol. 77, 1972, item 52961y, Sulfur Isotope Effects in Anion Exchange Systems, Acta Chem. Scand. 1972.

Chem. Abstracts, p. 336, vol. 88, 1978, item 12378j, Study of Ion-Exchange Equilibrium on ASD-3 and ASD-4, Anion Exchangers in Sodium Sulfite-Sodium Hydrogen Sulfite Solutions, USSR, 1977.

Chem. Abstracts, p. 280, vol. 88, 1978, item 78546u, Purification of Bleach Plant Effluents by Adsorption on Crosslinked Polymers, Sweden, 1977.

Primary Examiner—Thurman K. Page
Assistant Examiner—Peter F. Kulkosky

[57] ABSTRACT

A process for reducing decomposition products released during use or storage from a strong base, Type II anion exchange resin in the hydroxide form by reacting either the chloride form or the sulfate form of the resin with a bisulfite salt before conversion of the resin to the hydroxide form, and the resin prepared from the process.

10 Claims, 4 Drawing Sheets

REDUCTION OF LEACHABLES FROM TYPE II ANION EXCHANGE RESINS

CROSS-REFERENCE TO RELATED APPLICATION

This is a continuation of application Ser. No. 299,198, filed Jan. 23, 1989, now abandoned.

BACKGROUND OF THE INVENTION

This invention relates to a process for reducing the amount of decomposition products released from a Type II anion exchange resin in the hydroxide form, and it also relates to the resin prepared by this method.

Strongly basic, Type II quaternary ammonium resins are used primarily for water treatment applications, often in mixed bed ion exchange units. Examples of water treatment applications include the following: (1) dealkalizing softened water for make-up to boiler feeds and cooling towers, (2) reducing sulfate or nitrate in water supplies, (3) deionizing water supplies, and (4) removing oxygen from deionized water.

Type II resins in the chloride form typically exhibit excellent stability. Unfortunately, Type II resins regenerated with caustic and used in the hydroxide form are inherently less stable than Type II resins in the chloride form or strong base Type I resins, and therefore are often limited to certain applications requiring temperatures no greater than ambient. The decrease in stability for the hydroxide form resins has been linked to the release of decomposition products, primarily acetaldehyde, during use or storage. See, for example, Water Quality Association's Draft Response to the Environmental Protection Agency, Aug. 28,1987.

For users who regenerate with caustic, the choice between using a Type II resin in the hydroxide form or a strong base Type I resin for water treatment often depends on economics and the particular application. Type II resins offer greater ease of regeneration than Type I resins, but their regeneration efficiency can be counterbalanced by their relative chemical instability. Therefore, the preparation of a Type II resin in the hydroxide form that exhibits excellent stability during use or storage would overcome a significant disadvantage that these resins currently possess.

SUMMARY OF THE INVENTION

The invention is a process for reducing the concentration of decomposition products released during use or storage from a strong base, Type II anion exchange resin in the hydroxide form. This process comprises the step of reacting either the chloride form or the sulfate form of the resin with an effective amount of a bisulfite salt before conversion of the resin to the hydroxide form.

The invention is also the strong base, Type II anion exchange resin prepared from the process.

Surprisingly, resins prepared from the process of this invention release an acceptably low concentration of decomposition products, such as acetaldehyde, during storage or regeneration with an aqueous base such as caustic. Additionally, the release of decomposition products remains low after numerous regeneration cycles.

The resins prepared from the process of this invention can be used in those applications where strong base, Type II anion exchange resins in the hydroxide form are used. For example, the resins are particularly useful for deionizing water in mixed bed units for the preparation of ultrapure water and for demineralizing aqueous sugar solutions such as high fructose corn syrup.

DETAILED DESCRIPTION OF THE INVENTION

Strong base, Type II anion exchange resins are known and described in Kirk-Othmer, *Encyclopedia of Chemical Technology*, 3rd ed., Vol. 13, pp. 678–705 and Paterson, *An introduction to Ion Exchange*, pp. 12–13, Heyden & Son Ltd., Great Britain (1970). Examples of commercially available Type II resins include Dowex TM SAR gel resin, Dowex TM 22 macroporous resin and Dowex TM MSA-2 macroporous resin from The Dow Chemical Company: and Amberlite TM IRA-410 gel resin and Amberlite TM 910 macroporous resin from Rohm and Haas Company. The resins are preferably prepared by reacting chloromethylated copolymer beads with dimethylethanolamine to prepare a quaternary ammonium resin in the chloride form. Alternatively, the resins can be prepared by reacting the chloromethylated copolymer beads with other ethanolamines such as diethanolmethylamine, triethanolamine, diethylethanolamine or diethanolethylamine. Although treating the chloride form of the resin is most advantageous and economical, the sulfate form of the resin, which can be prepared by contacting the resin in the chloride form with an aqueous solution of sulfuric acid, can be treated using the process of this invention to significantly reduce the release of decomposition products during use or storage.

The copolymer beads are preferably crosslinked copolymer beads of a monovinyl aromatic monomer and a polyvinyl aromatic monomer. The preferred copolymer beads are a copolymer of up to about 99.75 weight percent styrene with the balance divinylbenzene (commercially available divinylbenzene containing less than about 45 weight percent ethylvinylbenzene).

Decomposition products are impurities released from the resin into the process stream or the storage medium, which is typically water. The impurities adversely affect the treated process stream for the desired application. The primary impurity is acetaldehyde, although other impurities may be advantageously treated by the method of this invention.

Figure 1:
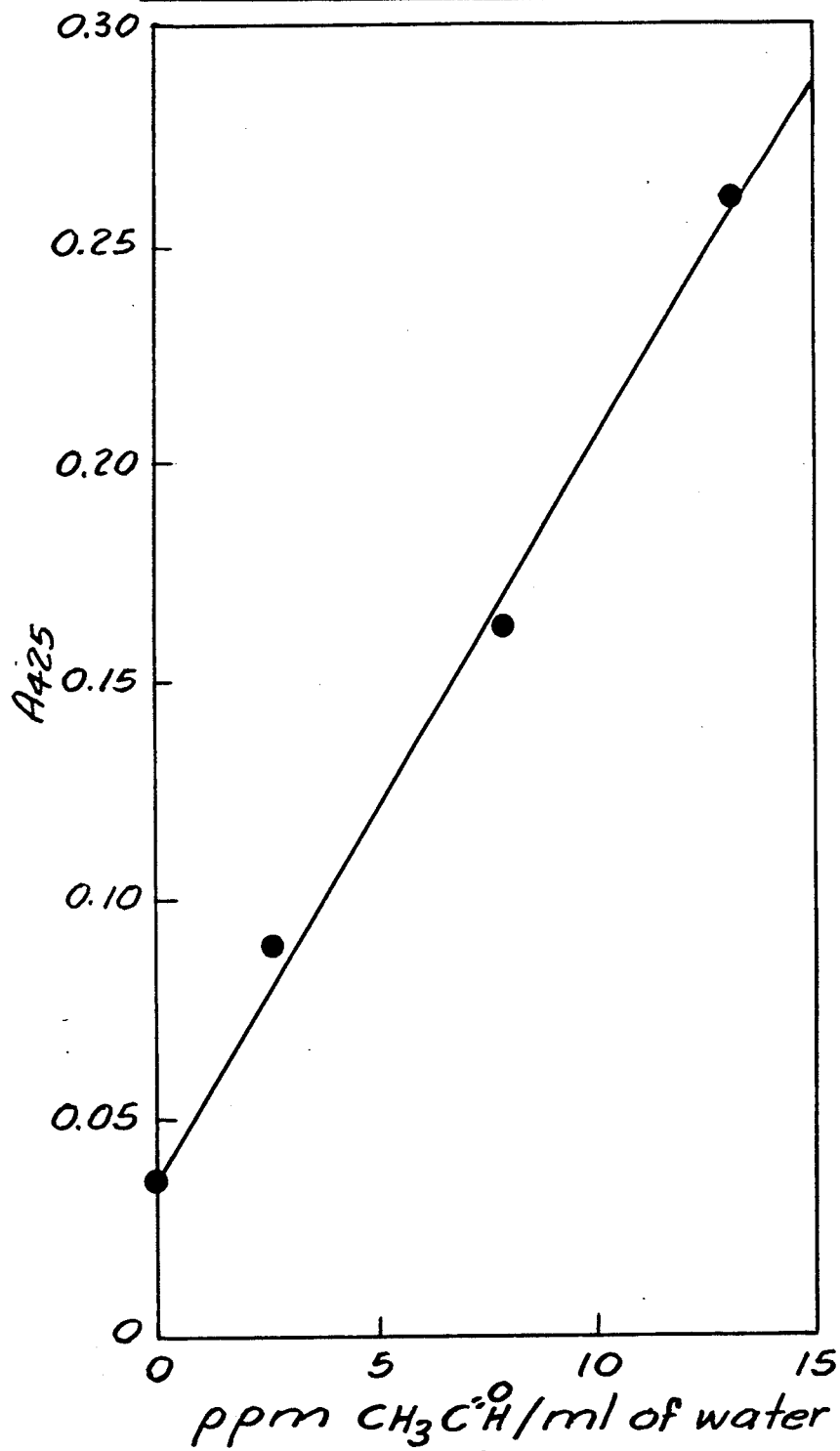
FIG. 1 is a plot showing the relationship between absorbance of UV light in an aqueous acetaldehyde solution treated with Nessler's reagent and concentration of acetaldehyde in solution.

Impurities in a process stream can be measured by following the procedures described in ASTM Standard D 1426, Method B (Direct Nesslerization). For purposes of describing this invention, a calibration curve for measuring acetaldehyde concentration in water was prepared by first mixing 0.1 milliliters (ml) Nessler's reagent with 5.0 ml of a solution with varying concentrations of acetaldehyde. The mixture was allowed to stand for 10-15 minutes, and then the absorbance was measured at a wavelength of 425 nm ($A_{425nm}$) using a Perkin-Elmer Lambda 4B UV/VIS Spectrophotometer. The relationship between the absorbance of the aqueous solution and the acetaldehyde (AA) concentration is shown in FIG. 1. The calibration curve is a straight line having the equation:

ppm AA/ml solution = 60(A425) − 2

Figure 2:
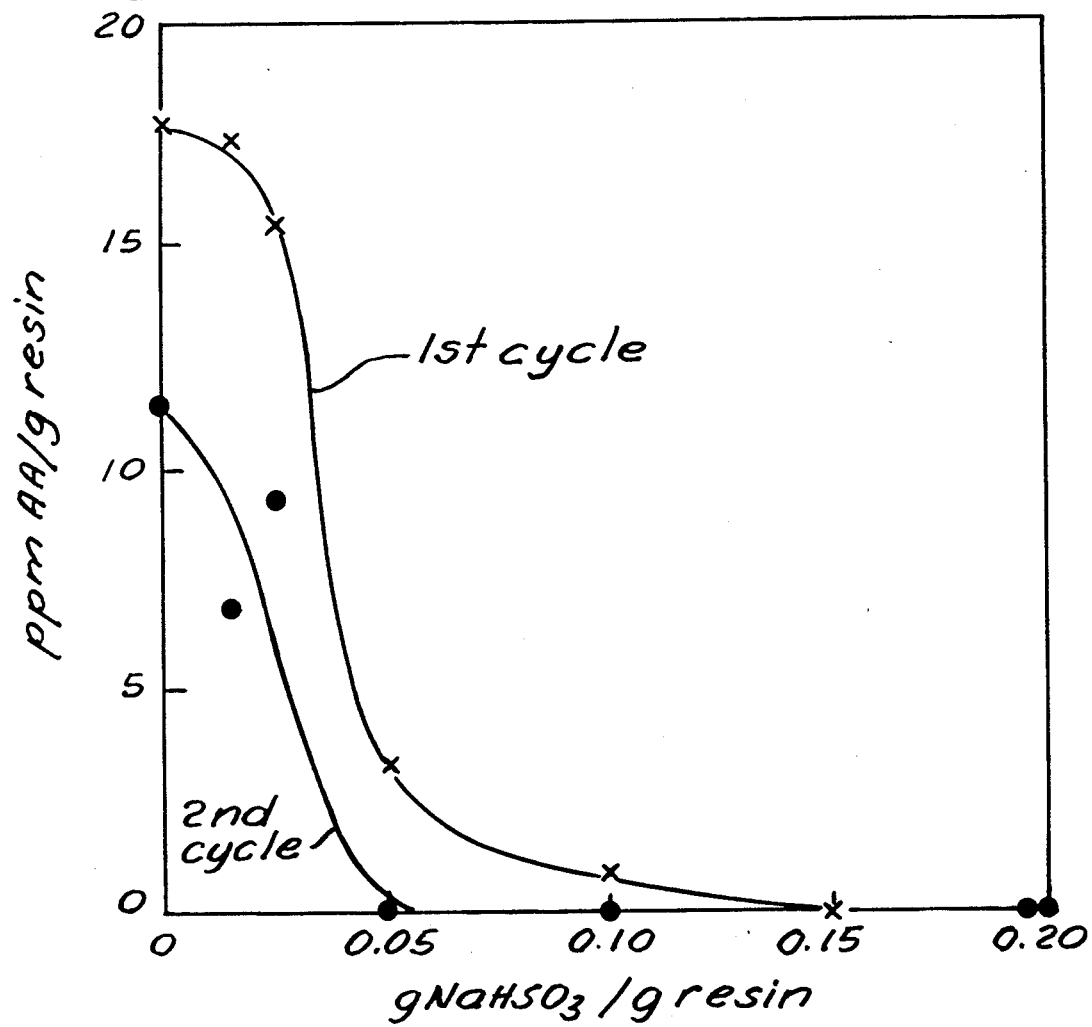
FIG. 2 is a plot showing the relationship between concentration of acetaldehyde released from a Type II resin in the hydroxide form into an aqueous solution and amount of bisulfite used to treat the resin.

An effective amount of bisulfite salt to react with either the chloride form or the sulfate form of the resin so as to reduce the concentration of decomposition products released during use is illustrated dramatically in FIG. 2. The data for FIG. 2 was generated by treating 20 grams (g) of Dowex ™ SAR Type II gel resin in the chloride form with varying levels of sodium bisulfite in 100 milliliters (ml) of DI water for two hours at room temperature. For the first cycle, the resin was given a brief water wash, converted to the hydroxide form by passing 500 ml of 1N sodium hydroxide through the resin bed in one hour, and then washing with 500 ml of DI water for 15 minutes. The treated resin was stored in 100 ml of DI water and the concentration of acetaldehyde released into the water was measured after 24 hours. For the second cycle, the resin was once again washed with 500 ml DI water, stored in 100 ml of DI water, and then measured for acetaldehyde release.

A significant reduction in concentration of acetaldehyde in the water, and therefore a significant reduction in the amount of decomposition products released from the resin during storage, is achieved at 0.05 g bisulfite/g resin, with the best results at greater than or equal to 0.10 g bisulfite/g resin. Improvements are noticeable within the range between about 0.02 to about 0.20 g bisulfite/g resin, preferably between about 0.05 to about 0.15 g bisulfite/g resin. As illustrated in FIG. 2, the effects of the bisulfite treatment become even more dramatic after each cycle.

The contact between the bisulfite salt and the resin can occur in any fashion that promotes sufficient contact between the salt and the resin. For example, the contact can occur in a batchwise manner or it can occur continuously in a packed column.

Figure 3:
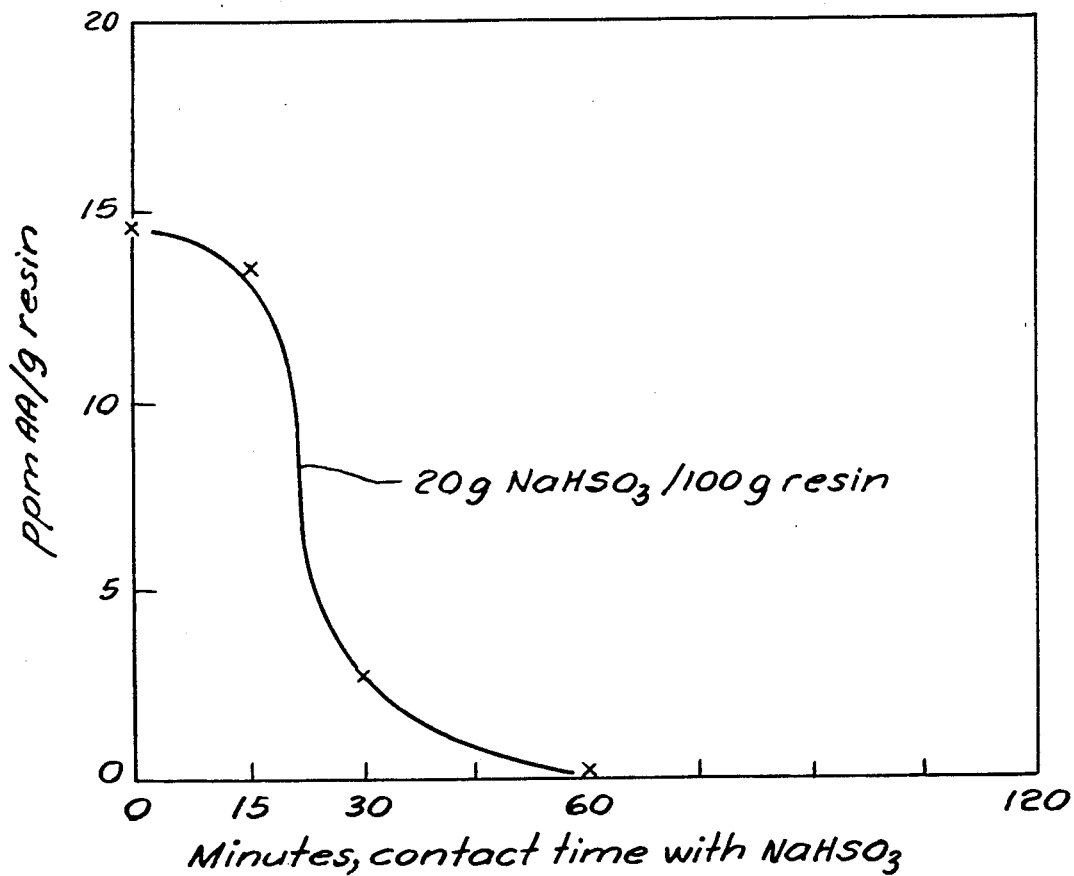
FIG. 3 is a plot showing the relationship between concentration of acetaldehyde released from a Type II resin in the hydroxide form into an aqueous solution and batchwise contact time of bisulfite treatment.
Figure 4:
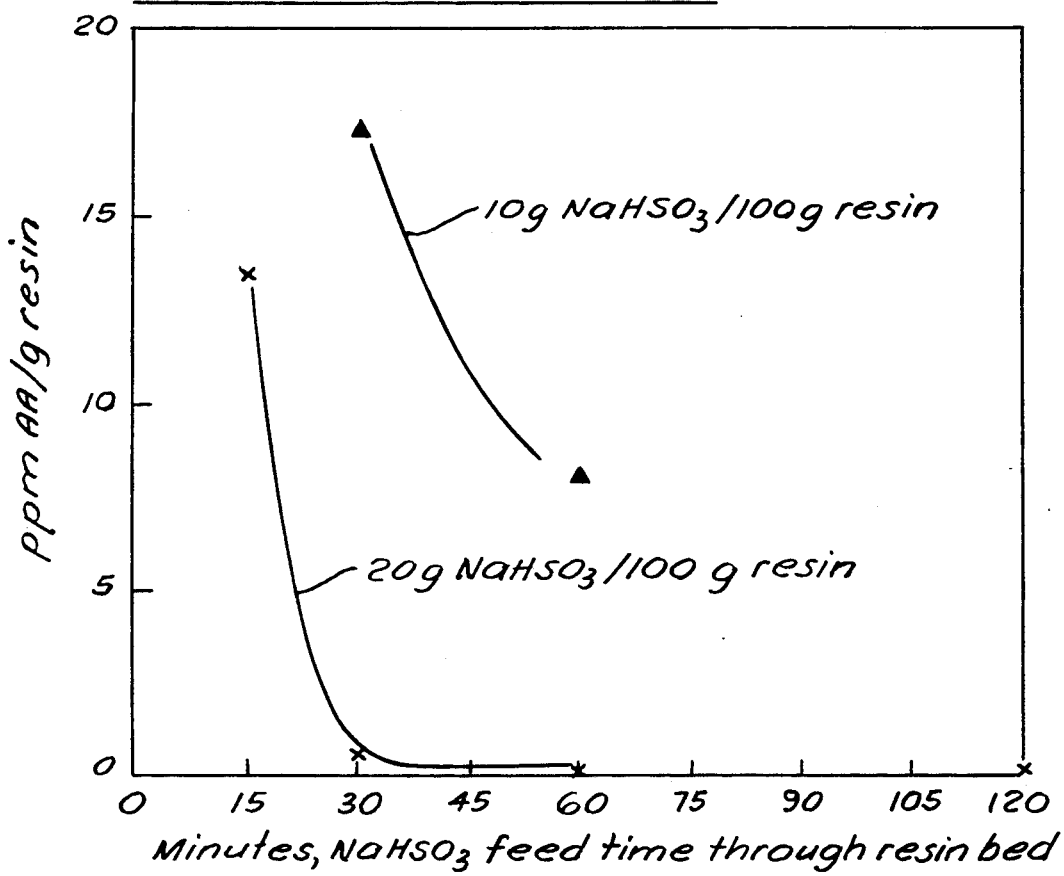
FIG. 4 is a plot showing the relationship between concentration of acetaldehyde released from a Type II resin in the hydroxide form into an aqueous solution and continuous contact time of bisulfite treatment.

Unexpectedly, the time required for the reaction of the bisulfite salt with either the chloride form or the sulfate form of the resin is longer than what is required to merely convert a plurality of the active ion exchange sites to bisulfite ions. FIGS. 3 and 4 show that a contact time of at least about 30 minutes, preferably at least about 60 minutes, is necessary for the reaction to occur and for the resin in the hydroxide form to release reduced concentrations of impurities during use or storage.

The data for FIG. 3 was generated by the following steps: (1) treating in a batchwise manner 20 g of Dowex ™ SAR Type II gel resin in the chloride form with 4.0 g sodium bisulfite in 100 ml water for varying contact times, (2) washing the treated resin rapidly with 500 ml of DI water, (3) converting the treated resin to the hydroxide form by passing chromatographically 500 ml of 1N sodium hydroxide through a bed of the resin in one hour, (4) washing the converted resin with 500 ml of DI water and storing the resin in 100 ml of DI water, and then (5) measuring the concentration of acetaldehyde released into the water after 24 hours.

The data for FIG. 4 was generated in a manner similar to the procedure described for generating the data for FIG. 3, except the chloride form of the resin was treated with sodium bisulfite continuously in a packed column, and the contact time was varied by controlling the flow rate of bisulfite solution through the column.

In order to promote intimate contact between the bisulfite salt and the resin, the bisulfite salt is preferably contacted with the resin as an aqueous solution. The concentration of the salt in water advantageously ranges from about 2 to about 8 weight percent, preferably from about 4 to about 8 weight percent. The bisulfite salt can be any alkali or alkaline earth metal bisulfite, or ammonium bisulfite, although sodium bisulfite is preferred. The contact temperature can range anywhere between room temperature and about 80° C. Temperatures greater than about 80° C. may cause the resin to degrade or decompose, and temperatures below room temperature are inconvenient.

Once either the chloride form or the sulfate form of the resin has been effectively treated with a bisulfite salt, it can be converted to the hydroxide form in any conventional manner for converting chloride-form resins to hydroxide-form resins. For example, the resin can be contacted for a sufficient time with an aqueous solution of an alkali or alkaline earth metal hydroxide, preferably caustic, at a concentration advantageously between 1 and 5N, preferably between 1 and 2N.

The following examples illustrate but are not intended to limit the scope of this invention.

EXAMPLES

Example 1

For each of two runs, 20 grams (g) of a styrene/divinylbenzene gel copolymer functionalized with dimethylethanolamine, sold commercially by The Dow Chemical Company as Dowex ™ SAR, in the chloride form, is treated with 100 milliliters (ml) of an aqueous solution containing 4.0 g sodium bisulfite at room temperature for 2 hours (hr). The resin is washed in a column with 500 ml of DI water.

For the first run, 300 ml of 1N sodium hydroxide is passed chromatographically through the resin bed to convert the resin to the hydroxide form. For the second run, the resin is converted to the hydroxide form by allowing the resin to stand in the caustic solution in a batchwise conversion.

Following conversion to the hydroxide form, the resin is rinsed with 500 ml of DI water and stored in a bottle containing 100 ml of DI water. The concentration of acetaldehyde in the bottle of water after 24 and 48 hr. is determined by following the procedures described in ASTM Standard D 1426, Method B (Direct Nesslerization). A sample aliquot is removed from the bottle and the acetaldehyde concentration is determined photometrically from the calibration curve shown in FIG. 1 by using 0.1 ml Nessler reagent per 5.0 ml of solution.

The acetaldehyde concentration for each run is shown in Table 1. The first and second runs are designated Sample Nos. 1 and 2, respectively. For comparison, the acetaldehyde released from a Dowex SAR resin in the hydroxide form which is not treated with bisulfite is also shown in Table 1 and is designated as Control No. 1.

TABLE I

Acetaldehyde Release From Resin After Treatment with NaHSO₃ at Room Temperature

| Sample No. | Concentration Acetaldehyde, ppm/g resin | |
|---|---|---|
| | After 24 hrs. | After 48 hrs. |
| Control 1 (no treatment) | 9.8 | 14.6 |
| 1 | undetectable | undetectable |
| 2 | undetectable | undetectable |

The data in Table I indicates that treating the resin with sodium bisulfite at room temperature before conversion to the hydroxide form reduces the release of acetaldehyde to undetectable levels when the treated resin is placed in water.

EXAMPLE 2

The procedure described in the first run of Example 1 is repeated, except Dowex TM SAR resin is replaced with a styrene/divinylbenzene macroporous copolymer functionalized with dimethylethanolamine, sold commercially by The Dow Chemical Company as Dowex TM 22.

The acetaldehyde concentration for the third run is shown in Table II. The third run is designated Sample No. 3. For comparison, the acetaldehyde released from a Dowex TM 22 resin in the hydroxide form which is not treated with bisulfite is also shown in Table II and is designated as Control No. 2.

TABLE II

Acetaldehyde Release from Resin After Treatment with NaHSO₃ at Room Temperature

| Sample No. | Acetaldehyde Concentration ppm/g Resin | |
|---|---|---|
| | After 29 hours | After 73 hours |
| Control 2 (no treatment) | 11.0 | 23.9 |
| 3 | 3.5 | 10.1 |

The data in Table II indicates that treating the resin with sodium bisulfite at room temperature before conversion to the hydroxide form reduces the release of acetaldehyde when the treated resin is placed in water.

EXAMPLE 3

For each of two additional runs, the procedure of Example 1 is repeated, except the bisulfite treatment is carried out at 60° C. instead of at room temperature. The acetaldehyde concentration in the bottle of water after 24 and 48 hr. is undetectable.

EXAMPLE 4

20 Grams of Dowex TM SAR resin in the chloride form is treated at room temperature in a column by passing 150 ml of an aqueous solution containing 4.0 g sodium bisulfite over 1 hr. The resin is washed with 500 ml of DI water over about 15 minutes (min). 500 Milliliters of 1N sodium hydroxide is passed through the resin bed over 1 hr. to convert the resin to the hydroxide form. The converted resin is washed with 500 ml of DI water over about 15 min. The release of acetaldehyde is measured using the procedures described in Example 1. No detectable amount of acetaldehyde is measured.

What is claimed is:

1. A process for reducing the concentration of acetaldehyde released during use or storage of a strong base anion exchange resin in the hydroxide form which has been prepared by reacting chloromethylated copolymer beads with an ethanolamine, wherein the acetaldehyde is associated with decomposition of the resin, the process comprising the step of contacting at reactive conditions in an aqueous medium either the chloride form or the sulfate form of the resin with at least about 0.02 gram bisulfite salt per gram resin for at least about 30 minutes and then converting the resin to the hydroxide form.

2. The process of claim 1 wherein the bisulfite salt is reacted with the chloride form of the resin.

3. The process of claim 1 wherein the resin is prepared by reacting chloromethylated copolymer beads of a monovinyl aromatic monomer and a polyvinyl aromatic monomer with dimethylethanolamine.

4. The process of claim 3 wherein the copolymer beads are a copolymer of up to about 99.75 weight percent styrene with the balance divinylbenzene.

5. The process of claim 1 wherein the amount of bisulfite salt reacted with either the chloride form or the sulfate form of the resin ranges between about 0.02 to about 0.20 gram bisulfite per gram resin.

6. The process of claim 5 wherein the amount of bisulfite ranges between about 0.05 to about 0.15 gram bisulfite per gram resin.

7. The process of claim 1 wherein the contact time is at least about 60 minutes.

8. The process of claim 1 wherein the bisulfite salt is an alkali or alkaline earth metal bisulfite or ammonium bisulfite.

9. The process of claim 8 wherein the bisulfite salt is sodium bisulfite.

10. The process of claim 1 wherein the bisulfite salt is reacted with either the chloride form or the sulfate form of the resin in the form of an aqueous solution.

* * * * *